May 13, 1969  C. V. WILLIAMS  3,443,328
IRONING TABLES

Filed March 14, 1967  Sheet 1 of 3

INVENTOR.
CHARLES VICTOR WILLIAMS
BY Kurt Kelman
AGENT

May 13, 1969     C. V. WILLIAMS     3,443,328
IRONING TABLES
Filed March 14, 1967     Sheet 2 of 3
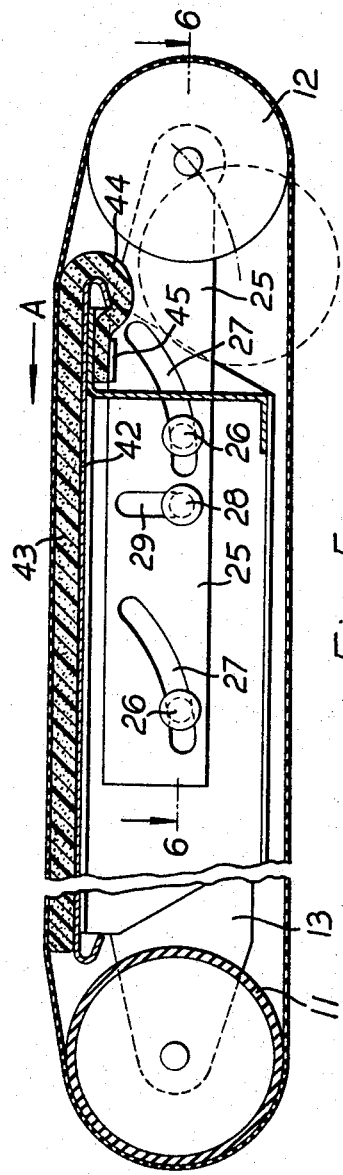
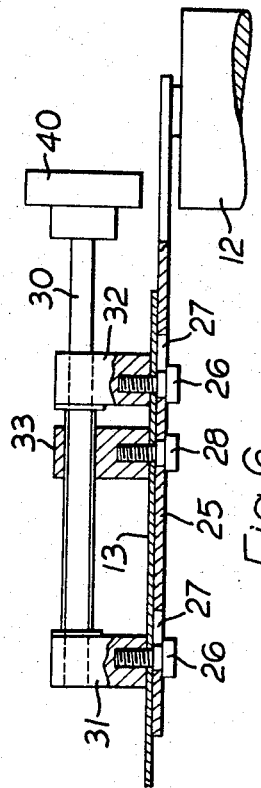
INVENTOR.
CHARLES VICTOR WILLIAMS
BY Kurt Kelman
AGENT May 13, 1969    C. V. WILLIAMS    3,443,328
IRONING TABLES Filed March 14, 1967    Sheet 3 of 3

INVENTOR.
CHARLES VICTOR WILLIAMS
BY Kurt Kelman
AGENT

United States Patent Office 3,443,328
Patented May 13, 1969

3,443,328
IRONING TABLES
Charles V. Williams, Rayleigh, England, assignor to Airflow Housewares Limited, Blackwood, England, a British company
Filed Mar. 14, 1967, Ser. No. 622,949
Claims priority, application Great Britain, Mar. 18, 1966, 11,987/66
Int. Cl. D06f *69/02, 81/10*
U.S. Cl. 38—104             1 Claim

ABSTRACT OF THE DISCLOSURE

An ironing table for use with an ordinary domestic electric smoothing iron, having a conveyor belt to support the article to be ironed, the belt being driven by a motor, and the upper run of the belt being supported on a yielding resilient pad.

---

This invention relates to ironing tables.

It is known to provide an ironing table with a conveyor belt which carries the work to be ironed between a pair of platens which are closed together, whilst the belt is stopped, so as to iron the work between the platens, and then after opening the platens, convey the work away or return it to the operator.

It is also known to continue the belt movement, for example in seam pressing machines, whilst the work is belt-conveyed past a stationary pressing platen or head, and also to iron the work between a pair of rotating rollers.

These known machines are satisfactory where a pressing operation is to be repeated on a number of identical work-pieces, for example in the manufacture of garments, and also for plain articles such as handkerchiefs, bed sheets and the like, but are not satisfactory where a range of different work-pieces is involved, such as in a private household when the weekly wash is to be ironed, or for ironing complex articles such as shirts.

The objects of the invention are to provide an improved ironing table adapted for use with a range of different articles and also to press complex articles.

In accordance with the invention, an ironing table comprises a conveyor belt for supporting articles to be ironed, means for moving the belt in at least one direction, means for controlling the belt movement, and means for tensioning the belt, the belt being supported on its upper run upon a rigid surface, with a yielding pad interposed between the belt and rigid surface.

The table in accordance with the invention is preferably small in length and even smaller in width, being free of incumbrance at the ends of the table, whereby for example a shirt may be draped over the whole of the table, the belt driven, and ironing effected with an ordinary domestic type electric smoothing iron. By effecting iron strokes in the opposite direction to the belt movement, the belt will tend to smooth the article being ironed and remove ruckles and unintentional pleats and folds, and this will greatly simplify the task of ironing the work crease free. The iron will be moved for example from side-to-side so as to effect the smoothing, and at times possibly in the same direction as the belt to allow the article to feed with the belt. However when the belt moves relative to the work, it will effect a pressing and smoothing action on the underside of the work, and this may avoid the necessity of ironing both sides in separate operations.

If desired the belt may be controlled from a switch remote from the table, for example by a foot switch.

In a more complex machine incorporating the invention, the remote switch is provided on the iron, so as to give complete control by the hand of the operator which directs and carries the iron.

Figure 1:
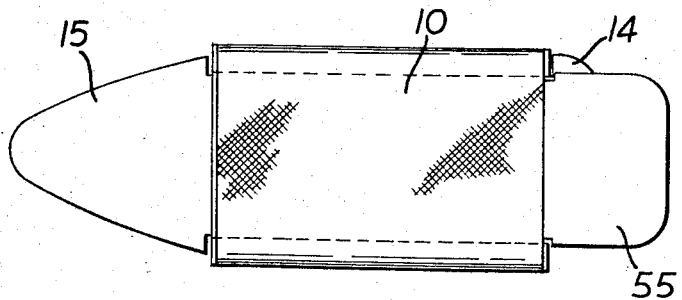
Figure 2:
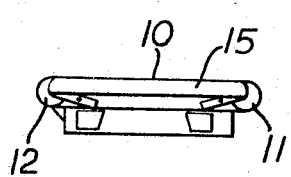
Figure 3:
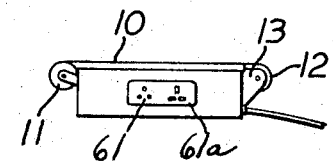
Figure 4:
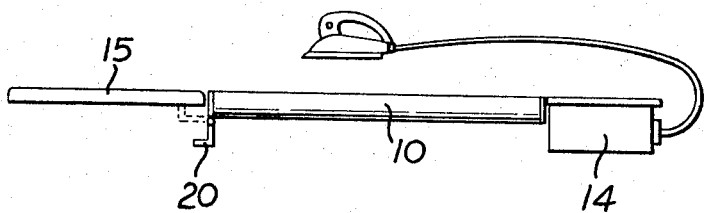
Figure 7:
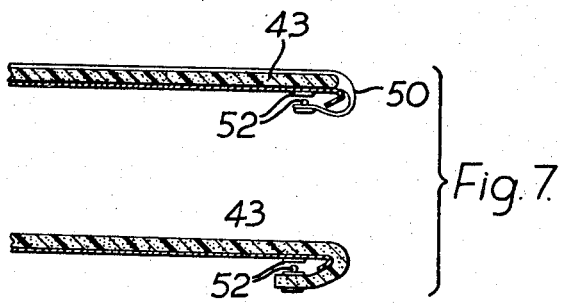
Figure 8:
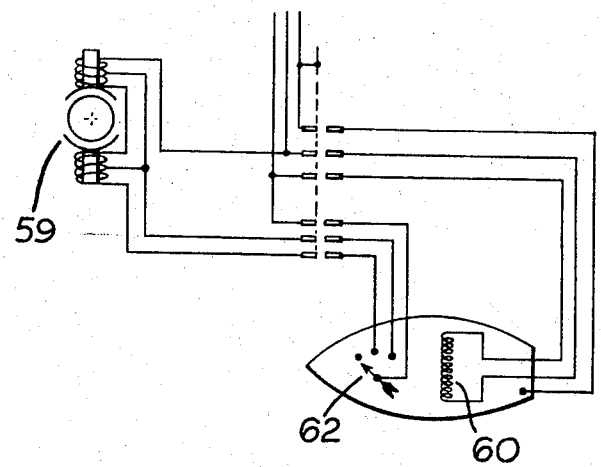

The invention will now be more particularly described with reference to the accompanying drawings wherein:
FIGURE 1 is a plan view of a complete table;
FIGURE 2 is a side elevation of the table;
FIGURE 3 is an opposite side elevation of the table;
FIGURE 4 is a front elevation of the table;
FIGURE 5 is an enlarged part-sectional side elevation of the table;
FIGURE 6 is a fragmentary sectional plan view taken on the line 6—6 of FIGURE 5;
FIGURE 7 shows alternative details; and
FIGURE 8 is a wiring diagram.

Referring now to the drawings, and particularly FIGURES 1 to 4 thereof, the improved ironing table as illustrated comprises a travelling belt or band 10 extending endlessly about parallel rollers 11, 12, the latter being supported on a skeleton frame 13, a box 14 housing circuits and located at one side of the belt, and a fixed pad 15 at the other side of the belt. FIGURE 4 shows a domestic electric smoothing iron connected to the table and possibly forming part of the combination.

Referring now to FIGURES 4 and 5, the table has a pair of feet 20, FIGURE 4, which may fold between the full line erected position and the dotted line folded position, to enable the belt 10 to be slipped off the rollers 11, 12 axially of the latter for replacement, repair, washing or other treatment. The table in use rests on feet 20 and on the base of box 14, and is adapted to be placed for example on a table support: if desired longer feet could be used to make the ironing table free-standing, and in this case the structure shown could be for example connected to detachable feet.

The roller 11 is driven from an electric motor located in the frame, by direct gearing, and the roller is journalled in the frame and has a friction cover for example of parallel moulded rubber ribs or possibly of thick fabric secured by adhesive on its cylindrical periphery, or alternatively the roller could be of moulded plastics construction provided with ribs or other means to frictionally drive the belt.

The frame includes a sub-frame 25, FIGURE 5, provided with lateral pins 26 guided in cam slots 27 in sub-frame 25 and with a third pin 28 guided in a slot 29 which is at right angles to the length of an adjustor spindle 30, FIGURE 6. Spindle 30 is captive with bosses 31, 32 fast with the pins 26, and hence with frame 13 and a nut 33 is fast with the third pin 28 and screw-engaged with the spindle, so that turning the knob 40 moves pins 26 along the slots 27 to take roller 12 between the dotted and full line positions, FIGURE 5, to tension the belt 10.

The belt 10 is fabricated from a low-friction material with suitable heat-resistance such as glass cloth and is preferably of endless weave: if seamed the seam may extend diagonally across the belt.

The frame 13 is provided with a relatively rigid support platform 42, FIGURE 5, and this is superimposed by a resilient yielding pad 43. The pad may be of foamed plastics and is anchored in position. FIGURE 5 illustrates one possibility in which the marginal end portion 44 of pad 43 most adjacent the roller 12 is turned under the platform and clamped by a bar 45. The clamping is at the end from which the belt is normally fed: that is, the normal feed direction is as arrow A FIGURE 5.

Alternatively as shown in FIGURE 7, upper part, the pad 43 may be loosely enclosed in a bag or envelope 50 which may be of woven nylon or glass cloth to have a low co-efficient of friction and in this case the frictional value of the pad itself is immaterial: the bag is turned under the platform and secured by a clamp bar 45 or by press-studs 52. The lower part of FIGURE 7 illustrates press-studs 52 fitted direct to the pad, without using an envelope or bag. Where the pad is used without a cover it is desirably of low-friction material such as skin-faced foamed plastics.

The box 14, FIGURES 1 and 4, is provided on its top with a heat-insulated platform 55 to form a support for the iron. The paltform may be flush with the top surface of the board.

There are, in general, two ways in which the ironing table may be controlled, differing only in minor respects. Firstly, the movement of the belt may be controlled from a switch on the table, for example on the box 14, although preferably a foot-operable treadle switch is provided connected to the circuitry by a cable. The cable may plug into a socket on the box. In this event, the two sockets 61, 61a illustrated in FIGURE 3 may be for the cable and for the iron lead respectively, and the table will have a lead with a plug for mains connection, the internal circuitry connecting the iron and the motor, in the latter case via the treadle switch.

Alternatively, instead of using a treadle or other switch on the table or remote therefrom, the iron itself may be modified to provide an extra switch for motor control and belt feed, and these can be connected into a single multi-pin socket on the box 14.

It is believed that a single speed uni-directional motor giving a belt travel rate of between 2 and 6 feet per minute will be eminently satisfactory for all ironing purposes. The top run of the belt will normally feed away from the user of the table, so that in the plan view, FIGURE 1, the operator will stand at a position below the table in the figure: the iron rest is then convenient for the user's right hand, but the table can be adapted for left hand operaiton quite simply, for example by making both the pad 15 and the iron support platform 55 detachable, for example having lugs to hook engage in the frame, so that they can be interchanged. However, if desired the belt may be made to travel at any of a range of speeds, and/or be reversible, under the control of suitable switch means.

The pad 15 has a resilient yielding surface flush with the top run of the board and superimposed on a rigid support, for example a sheet metal base, and is of triangular or half elliptical plan shape, to facilitate ironing of complex shapes such as ruffles or pleats, or collars attached to shirts.

The detachability of pad 15 assists in providing a compact table for storage and transport.

FIGURE 8 shows a circuit including a shaded pole or series wound two speed motor 59 with the iron heating element 60 connected to the supply and with switch 62 for the motor provided on the iron.

I claim:
1. An ironing table for use with a conventional hand-held pressing iron, said ironing table comprising a supporting frame including a rigid platform having a pair of opposite side edges, a removable cushion pad substantially coextensive with and positioned on said platform, means separably attaching only one side edge of said pad to the corresponding side edge of the platform, a pair of elongated rollers rotatably journalled in said frame adjacent and parallel to the respective side edges of the platform, an endless conveyor belt engaging said rollers and having a top run passing across said cushion pad on the platform, the full length of the top run of said belt being exposed and constituting a receiving area for articles to be pressed by a hand-held iron against backing provided by the cushion pad on the rigid platform, and means for driving said belt so that the top run thereof moves in a direction away from said attaching means of said pad to the platform.

References Cited

UNITED STATES PATENTS

| 1,602,972 | 10/1926 | Forshee | 38—10 |
| 1,744,086 | 1/1930 | Troisi | 38—10 |
| 1,976,976 | 10/1934 | Zimarek et al. | 38—10 |
| 2,038,050 | 4/1936 | Long | 38—10 |
| 2,070,996 | 2/1937 | Meyer | 38—10 |
| 2,379,788 | 7/1945 | Clark | 38—11 |
| 2,782,536 | 2/1957 | Kroener et al. | 38—11 |
| 2,924,898 | 2/1960 | Coss | 38—11 |
| 3,029,535 | 4/1962 | Clearman et al. | 38—8 X |

PATRICK D. LAWSON, *Primary Examiner.*

GEORGE V. LARKIN, *Assistant Examiner.*

U.S. Cl. X.R.

38—10